United States Patent
Abe et al.

(10) Patent No.: US 8,989,965 B2
(45) Date of Patent: Mar. 24, 2015

(54) ELECTRIC POWER STEERING APPARATUS

(75) Inventors: Hirokazu Abe, Maebashi (JP); Yoshiki Ninomiya, Maebashi (JP)

(73) Assignee: NSK Ltd., Tokyo (JP)

( * ) Notice: Subject to any disclaimer, the term of this patent is extended or adjusted under 35 U.S.C. 154(b) by 374 days.

(21) Appl. No.: 13/058,051

(22) PCT Filed: Nov. 5, 2010

(86) PCT No.: PCT/JP2010/069673
§ 371 (c)(1),
(2), (4) Date: Feb. 8, 2011

(87) PCT Pub. No.: WO2011/102028
PCT Pub. Date: Aug. 25, 2011

(65) Prior Publication Data
US 2011/0231064 A1 Sep. 22, 2011

(30) Foreign Application Priority Data

Feb. 17, 2010 (JP) .................... 2010-032062
Jun. 10, 2010 (JP) .................... 2010-132996

(51) Int. Cl.
*B62D 6/00* (2006.01)
*B62D 5/04* (2006.01)

(52) U.S. Cl.
CPC ........... *B62D 5/0481* (2013.01); *B62D 5/0463* (2013.01)
USPC .................... 701/41; 701/36; 701/42; 701/43

(58) Field of Classification Search
USPC ........ 701/36, 41, 42, 43; 180/204, 6.28, 6.44, 180/6.48, 6.62, 405, 443, 447
See application file for complete search history.

(56) References Cited

U.S. PATENT DOCUMENTS

| | | | | |
|---|---|---|---|---|
| 4,039,928 | A * | 8/1977 | Noftsker et al. | 323/326 |
| 6,795,762 | B2 * | 9/2004 | Itoh et al. | 701/43 |
| 7,031,813 | B2 * | 4/2006 | Sugiyama et al. | 701/41 |
| 7,389,851 | B2 * | 6/2008 | Miyaura | 180/446 |
| 7,894,956 | B2 * | 2/2011 | Kondo et al. | 701/41 |
| 2009/0071745 | A1 * | 3/2009 | Itakura et al. | 180/446 |

FOREIGN PATENT DOCUMENTS

| | | |
|---|---|---|
| JP | 2000198457 | 7/2000 |
| JP | 2001122143 | 5/2001 |
| JP | 2003182605 | 7/2003 |
| JP | 2005067414 | 3/2005 |
| JP | 2005-193751 A | 7/2005 |

(Continued)

*Primary Examiner* — Behrang Badii
*Assistant Examiner* — Daniel L Greene
(74) *Attorney, Agent, or Firm* — Sughrue Mion, PLLC

(57) ABSTRACT

An electric power steering apparatus includes a steering torque detector for detecting a steering torque applied to a steering mechanism, a motor for generating an assist force that assists steering of a steering wheel, a power voltage detector for detecting a power voltage of a power supply, a power voltage monitoring section for determining a power voltage detection value detected by the power voltage detector and a motor drive controller for calculating an assist amount based on the steering torque and controlling drive of the motor through a driving section. Assist control is maintained based on a drive possible characteristic corresponding to a reduction level of the power voltage of FETs when the power voltage monitoring section determines that the power voltage detection value is less than or equal to an assist operation possible power voltage.

9 Claims, 13 Drawing Sheets

(56) References Cited

FOREIGN PATENT DOCUMENTS

| JP | 2007112345 | 5/2007 |
| JP | 2007-290429 A | 11/2007 |
| JP | 2009161156 | 7/2009 |

* cited by examiner

PRIOR ART

PRIOR ART

FIG.10
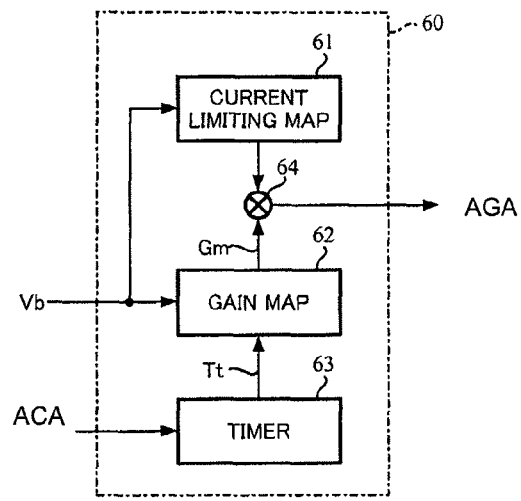
FIG.11
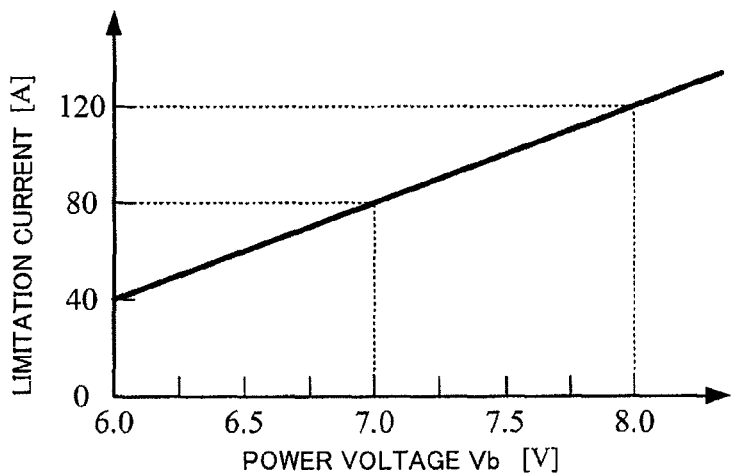
FIG.12
| DURATION OF VOLTAGE DROP STATE | GAIN | | |
|---|---|---|---|
| | 8V | 7V | 6V |
| MORE THAN OR EQUAL TO 0ms ~ LESS THAN 5ms | 1.0 | 1.0 | 1.0 |
| MORE THAN OR EQUAL TO 5ms ~ LESS THAN 10ms | 1.0 | 1.0 | 0.9 |
| MORE THAN OR EQUAL TO 10ms ~ LESS THAN 20ms | 1.0 | 0.9 | 0.7 |
| MORE THAN OR EQUAL TO 20ms ~ LESS THAN 50ms | 1.0 | 0.8 | 0.5 |
| MORE THAN OR EQUAL TO 50ms ~ LESS THAN 100ms | 1.0 | 0.7 | 0.3 |
| MORE THAN OR EQUAL TO 100ms ~ LESS THAN 150ms | 0.8 | 0.5 | 0.1 |
| MORE THAN OR EQUAL TO 150ms ~ LESS THAN 200ms | 0.5 | 0.3 | 0.0 |
| MORE THAN OR EQUAL TO 200ms ~ LESS THAN 300ms | 0.3 | 0.1 | 0.0 |
| MORE THAN OR EQUAL TO 300ms ~ | 0.0 | 0.0 | 0.0 |

FIG.15

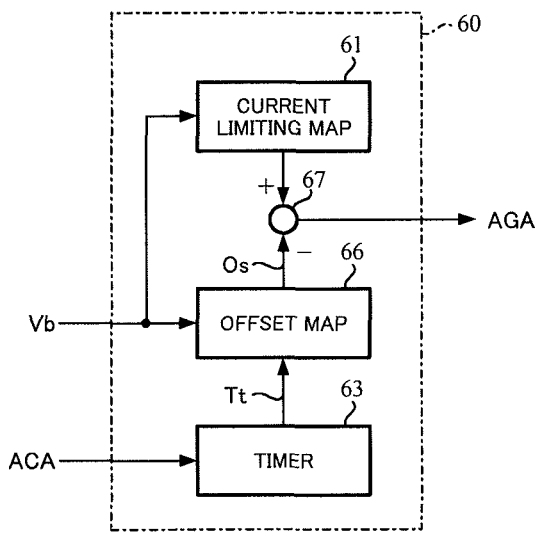

FIG.16

| DURATION OF VOLTAGE DROP STATE | OFFSET | | |
|---|---|---|---|
| | 8V | 7V | 6V |
| MORE THAN OR EQUAL TO 0ms ~ LESS THAN 5ms | 0 | 0 | 0 |
| MORE THAN OR EQUAL TO 5ms ~ LESS THAN 10ms | 0 | 0 | 4A |
| MORE THAN OR EQUAL TO 10ms ~ LESS THAN 20ms | 0 | 8A | 12A |
| MORE THAN OR EQUAL TO 20ms ~ LESS THAN 50ms | 0 | 16A | 20A |
| MORE THAN OR EQUAL TO 50ms ~ LESS THAN 100ms | 0 | 24A | 28A |
| MORE THAN OR EQUAL TO 100ms ~ LESS THAN 150ms | 24A | 40A | 36A |
| MORE THAN OR EQUAL TO 150ms ~ LESS THAN 200ms | 60A | 56A | 40A |
| MORE THAN OR EQUAL TO 200ms ~ LESS THAN 300ms | 84A | 72A | 40A |
| MORE THAN OR EQUAL TO 300ms ~ | 120A | 80A | 40A |

| DURATION OF VOLTAGE DROP STATE | GAIN | | |
|---|---|---|---|
| | 8V | 7V | 6V |
| MORE THAN OR EQUAL TO 0ms ~ LESS THAN 5ms | 1.0 | 1.0 | 1.0 |
| MORE THAN OR EQUAL TO 5ms ~ LESS THAN 10ms | 1.0 | 0.9 | 0.8 |
| MORE THAN OR EQUAL TO 10ms ~ LESS THAN 20ms | 1.0 | 0.8 | 0.7 |
| MORE THAN OR EQUAL TO 20ms ~ LESS THAN 50ms | 0.9 | 0.7 | 0.5 |
| MORE THAN OR EQUAL TO 50ms ~ LESS THAN 100ms | 0.9 | 0.7 | 0.2 |
| MORE THAN OR EQUAL TO 100ms ~ LESS THAN 150ms | 0.7 | 0.4 | 0.1 |
| MORE THAN OR EQUAL TO 150ms ~ LESS THAN 200ms | 0.4 | 0.2 | 0.0 |
| MORE THAN OR EQUAL TO 200ms ~ LESS THAN 300ms | 0.2 | 0.1 | 0.0 |
| MORE THAN OR EQUAL TO 300ms ~ | 0.0 | 0.0 | 0.0 |

(B)

| DURATION OF VOLTAGE DROP STATE | GAIN | | |
|---|---|---|---|
| | 8V | 7V | 6V |
| MORE THAN OR EQUAL TO 0ms ~ LESS THAN 5ms | 1.0 | 1.0 | 1.0 |
| MORE THAN OR EQUAL TO 5ms ~ LESS THAN 10ms | 1.0 | 0.8 | 0.7 |
| MORE THAN OR EQUAL TO 10ms ~ LESS THAN 20ms | 1.0 | 0.7 | 0.6 |
| MORE THAN OR EQUAL TO 20ms ~ LESS THAN 50ms | 0.9 | 0.6 | 0.4 |
| MORE THAN OR EQUAL TO 50ms ~ LESS THAN 100ms | 0.8 | 0.6 | 0.1 |
| MORE THAN OR EQUAL TO 100ms ~ LESS THAN 150ms | 0.6 | 0.3 | 0.0 |
| MORE THAN OR EQUAL TO 150ms ~ LESS THAN 200ms | 0.3 | 0.1 | 0.0 |
| MORE THAN OR EQUAL TO 200ms ~ LESS THAN 300ms | 0.1 | 0.0 | 0.0 |
| MORE THAN OR EQUAL TO 300ms ~ | 0.0 | 0.0 | 0.0 |

ELECTRIC POWER STEERING APPARATUS

CROSS REFERENCE TO RELATED APPLICATIONS

This application is a National Stage of International Application No. PCT/JP2010/069673 filed Nov. 5, 2010, claiming priority based on Japanese Patent Application No. 2010-032062 filed Feb. 17, 2010 and Japanese Patent Application No. 2010-132996 filed Jun. 10, 2010, the contents of all of which are incorporated herein by reference in their entirety.

TECHNICAL FIELD

The present invention relates to an electric power steering apparatus that provides a steering system of a vehicle with an assist force by a motor, and in particular to an electric power steering apparatus that is capable of certainly suppressing behaviors of steering control in the case of power voltage drop due to such as at a time of start-up of cranking.

BACKGROUND ART

An electric power steering apparatus which provides a steering mechanism of a vehicle with a steering assist torque (an assist torque) by means of a rotational torque of a motor, applies a driving force of the motor as the assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a current command value and a motor current becomes small, and the adjustment of the voltage applied to the motor is generally performed by an adjustment of a duty ratio of a PWM (Pulse Width Modulation) control.

A general configuration of such an electric power steering apparatus will be described with reference to FIG. 1. A column shaft 2 connected to a steering wheel (handle) 1 is connected to tie rods 6 of steered wheels through reduction gears 3, universal joints 4A and 4B, and a rack and pinion mechanism 5. The column shaft 2 is provided with a torque sensor 10 for detecting the steering torque of the steering wheel 1 in accordance with torsion of a torsion bar, and a motor 20 for assisting the steering force of the steering wheel 1 is connected to the column shaft 2 through the reduction gears 3. Electric power is supplied to a control unit 30 for controlling the electric power steering apparatus from a battery 14, and an ignition key signal is inputted into the control unit 100 through an ignition key 11. The control unit 30 calculates a current command value I of an assist command based on a steering torque Tr detected by the torque sensor 10 and a velocity Vel detected by a velocity sensor 12, and controls a current supplied to the motor 20 based on the calculated current command value I.

The control unit 30 mainly comprises a CPU (or an MPU or an MCU), and general functions performed by a program within the CPU are shown in FIG. 2.

The functions and operations of the control unit 30 will be described with reference to FIG. 2. The steering torque Tr detected by the torque sensor 10 and the velocity Vel from the velocity sensor 12 are inputted to a steering assist command value calculating section 31, and a steering assist command value Iref is calculated by using an assist map. With respect to the calculated steering assist command value Iref, the output is limited based on an overheat protection condition in a maximum output limiting section 32, the current command value I that the maximum output is limited is inputted to a subtracting section 33.

Moreover, in addition to the steering torque Tr and the velocity Vel, it is also possible to calculate the steering assist command value Iref by using a steering angle in the steering assist command value calculating section 31.

The subtracting section 33 obtains a deviation $\Delta I(=I-i)$ between the current command value I and a motor current i of the motor 20 that is fed back, the deviation $\Delta I$ is controlled by a current control section 34 such as PI (proportional and integral), the controlled current control value E is inputted to a PWM-control section 35 to calculate a duty ratio, and drives the motor 20 through a motor driving circuit 36. The motor current i of the motor 20 is detected by a motor current detecting circuit 37, and the motor current i is inputted to the subtracting section 33 to be fed back.

A configuration example of the motor driving circuit 36 will be described with reference to FIG. 3. In the case of a three-phase motor, the motor driving circuit 36 comprises an FET gate driving circuit 361 that drives each of field-effect transistors (FET1 to FET6) based on a pulse width modulation (PWM) signal from the PWM control section 35, an inverter 362 comprising a three-phase bridge circuit of FET1 to FET6 and a step-up power supply 363 that drives high side FETs (FET1, FET2 and FET3). Moreover, with respect to FET to FET6, a diode for surge absorbing is connected in anti-parallel between source and drain, respectively. Electric power is supplied from the battery 14 as a power supply to the inverter 362 through the ignition key 11 and a power relay RL. The inverter 362 comprises an FET-array that an FET1 and an FET4 connected in series, an FET-array that an FET2 and an FET5 connected in series, and an FET-array that an FET3 and an FET6 connected in series, these three FET-arrays connected in series, are connected in parallel. From a connecting point of the FET1 and the FET4 in the inverter 362, a connecting point of the FET2 and the FET5 in the inverter 362 and a connecting point of the FET3 and the FET6 in the inverter 362, each motor phase current is supplied to the motor 20 through supply routes "a", "b" and "c".

In such an electric power steering apparatus, the battery 14 supplies the electric power to loading apparatuses such as the control unit 30, the torque sensor 10, the motor 20 and so on. In order to assist for steering operations of a driver to be stable normally, it is necessary to maintain the power voltage of the battery 14 in a given stable range (for example, 10V-15V). However, in a situation such as cranking, there is a possibility that the power voltage reduction occurs.

In a state that the power voltage dropped, the gate driving voltage of the FET used in the motor driving circuit 36 drops. In this case, when the voltage (VGS) from gate to source of the FET dropped, the drain-source on-state resistance (RDS (ON)) becomes large abruptly. For comparison, there is a relation such as the following Expression 1 between a maximum driving current Imax and an allowable power value P of the FET.

$$P = RDS(ON) \cdot I_{max}^2 \qquad \text{[Expression 1]}$$

where, "P" is the allowable power value of the FET, "RDS (ON)" is the drain-source on-state resistance of the FET, and "Imax" is a motor maximum current that can pass in the FET.

From the relation of the above Expression 1, in the case of drive control of the motor 20, when the drain-source on-state resistance (RDS (ON)) of the FET becomes large, power loss also becomes large. Therefore, when the power voltage dropped, due to heat occurred by power loss of the FETs, the temperature increases. In addition, when the power voltage reduction continues, there is a possibility that a failure that the FET is damaged by burnout occurs.

Further, when the power voltage dropped dramatically and dropped to less than or equal to a sensor minimum operating voltage of the torque sensor 10, the output of the torque sensor 10 descends, a neutral position of the steering wheel 1 becomes being off track, the current characteristic of the motor 20 also becomes being off track from the neutral position of the steering wheel 1. Therefore, there was such a problem, that is, a bilateral difference of the steering force of the steering wheel occurs, when the bilateral difference becomes abysmal, a trouble such as "the steering wheel is taken" occurs, the steering feeling becomes bad. That is to say, when the power voltage becomes less than or equal to a certain voltage value, the torque sensor 10 cannot work normally.

Therefore, when the power voltage dropped, in order to keep a good steering feeling, it is necessary to limit or shut down the assist control. In order to solve such a problem, in Patent Document 1 (Japanese Patent Application Laid-open No. 2005-193751), an electric power steering apparatus that limits the assist amount by the means of a variable limitation value in accordance with the power voltage in the case of the power voltage drop, is proposed. Further, in Patent Document 2 (Japanese Patent Application Laid-open No. 2007-290429), an electric power steering apparatus that comprises semiconductor switching elements with a low on-state resistance at a time of low voltage, when the power voltage is more than or equal to a lower limit of the operation voltage, performs the control of the electric motor, and when the power voltage is less than the operation voltage, shuts down the control of the electric motor, is proposed.

THE LIST OF PRIOR ART DOCUMENTS

Patent Documents

Patent Document 1: Japanese Patent Application Laid-open No. 2005-193751
Patent Document 2: Japanese Patent Application Laid-open No. 2007-290429

SUMMARY OF THE INVENTION

Problems to be Solved by the Invention

However, recently as a demand from the viewpoint of environmental protection, vehicles that have a so-called idling-stop function (i.e. shutting down the engine during the stop of the vehicle) increase. In such a vehicle, in order to restart the engine that shut down, cranking is carried out frequently. Then, in the case of the cranking, a variation in the power voltage is considerably intense, and there is a possibility that the power voltage becomes beyond the assist possible voltage, in such a case, there is a possibility that the assist shuts down abruptly. When shutdown of the assist occurs, there is a possibility that steering behaviors such as kickback and abnormal noises occur, giving an uncomfortable feeling to drivers, and largely affecting quality of the whole electric power steering apparatus.

Further, in the electric power steering apparatus of Patent Document 1, since varying the assist level by means of the value of the power voltage till reaching the operating limit voltage, there is a feature capable of performing a smooth assist control. However, since shutting down the assist control when the power voltage dropped to less than or equal to an assist shutdown voltage, in the case that there is a possibility that the power voltage drop to a considerably low level such as cranking, there is a problem that cannot apply the electric power steering apparatus disclosed in Patent Document 1.

Moreover, although the electric power steering apparatus of Patent Document 2 reduces the heating value by using the FETs with a low on-state resistance at a time of low voltage and works even in a low voltage, there is a possibility that the voltage drop occurs in the cranking, the variation is large, when the power voltage is less than the operation voltage of the torque sensor, the control become unstable.

The present invention has been developed in view of the above described circumstances, and an object of the present invention is to provide an electric power steering apparatus that is capable of suppressing behaviors of steering assist and performing assist control without an uncomfortable feeling even though a power voltage varied drastically during cranking.

Further, another object of the present invention is to provide an electric power steering apparatus that is capable of suppressing behaviors of steering assist and performing assist control without an uncomfortable feeling by that even if the power voltage varies intensely, in accordance with a time course of dropping to less than an assist operation possible power voltage, calculating an assist possible current by referring to a current limiting map and maintaining the assist with a limited condition based on the assist possible current.

Means for Solving the Problems

The present invention relates to an electric power steering apparatus that comprises a steering torque detecting means for detecting a steering torque applied to a steering mechanism; a motor for generating an assist force that assists steering of a steering wheel; a power voltage detecting means for detecting a power voltage of a power supply; a power voltage monitoring section for determining a power voltage detection value detected by said power voltage detecting means; and a motor drive control means for calculating an assist amount based on said steering torque and controlling drive of said motor through a driving section comprising an FET-bridge, the above-described object of the present invention is achieved by that assist control is maintained based on a drive possible characteristic corresponding to a reduction level of said power voltage of FETs comprising said FET-bridge when said power voltage monitoring section determined that said power voltage detection value is less than or equal to an assist operation possible power voltage.

Further, the above-described object of the present invention is more effectively achieved by that said drive possible characteristic is a characteristic that as said power voltage detection value becomes low, an assist duration becomes short; or by that when said power voltage monitoring section determines that said power voltage detection value is less than or equal to a torque sensor minimum operating voltage of said steering torque detecting means, said motor drive control means sets a torque detection value just before said power voltage dropped to less than or equal to said torque sensor minimum operating voltage or a past torque detection value as a steering torque, and performs said assist control; or by that when said power voltage monitoring section determined that said power voltage detection value dropped to less than an assist operation possible power voltage, in accordance with a time course of dropping to less than said assist operation possible power voltage, an assist possible current limitation value is calculated by referring to a current limiting map that defines a current limitation value corresponding to a reduction level of said power voltage, and said motor drive control means maintains assist control by means of said assist possible current limitation value; or by that calculation of said assist possible current limitation value is performed by multiplying said current limiting map by a gain corresponding to said time course; or by that calculating of said assist possible current limitation value is performed by subtracting an offset corresponding to said time course from said current limiting map; or by that when said power voltage monitoring section determined that said power voltage detection value dropped to less than said assist operation possible power voltage, an assist continuation permissible time is obtained based on said power voltage detection value, and assist control is maintained within said assist continuation permissible time; or by that said motor drive control means corrects said assist amount by using an assist correction gain calculated based on said assist continuation permissible time; or by that said drive possible characteristic is corrected in accordance with an internal temperature of an ECU.

Effects of the Invention

According to the electric power steering apparatus of the present invention, in the case that a power voltage drop occurs due to at a time of start-up of cranking, the electric power steering apparatus of the present invention sets up an assist continuation permissible time in accordance with the power voltage, and maintains the assist control within the assist continuation permissible time while limiting the assist amount by means of the assist correction gain obtained based on the assist continuation permissible time, it is possible to suppress a variation in behaviors of the steering assist and enhance merchantability.

According to another embodiment, the electric power steering apparatus of the present invention comprises a current limiting map that defines a current limitation value corresponding to a reduction level of the power voltage based on a drive possible characteristic of the FETs, in the case that the power voltage drop occurs due to at the time of start-up of cranking, calculates an assist possible current limitation value by referring to the current limiting map in accordance with a time course of dropping to less than an assist operation possible power voltage of the FETs, and maintains the assist control with a limited limitation, it is possible to suppress a variation in behaviors of the steering assist and enhance merchantability.

Further, according to the present invention, in the case that the power voltage dropped to less than or equal to a minimum operating voltage of the torque sensor, since setting a detection value of the steering torque just before the power voltage dropped to less than or equal to the minimum operating voltage of the torque sensor or a past detection value of the steering torque as an alternative value of the steering torque and calculating a steering assist command value (a current command value), without shutting down assist control, even in the case that the power voltage dropped to less than or equal to the minimum operating voltage of the torque sensor during cranking, it is possible to perform the assist control without an uncomfortable feeling.

Moreover, according to the present invention, when calculating the assist correction gain, varying the assist amount by adding an internal temperature characteristic of an ECU, or when calculating the assist possible current limitation value, varying the assist amount (the assist possible current limitation value) by using an appropriate gain map or an appropriate offset map that corresponds to the ECU temperature, the steering operation during an idling-stop also becomes possible even in a high-temperature environment.

BRIEF DESCRIPTION OF THE DRAWINGS

In the accompanying drawings:

FIG. 10 is a block diagram showing a configuration example of an assist amount correcting section;

FIG. 11 is a current limiting map showing a characteristic example (120 [A] Specification) of a current limitation value of the FET with respect to the power voltage;

FIG. 12 is a characteristic diagram showing an example of a gain map;

FIG. 15 is a block diagram showing another configuration example of the assist amount correcting section;

FIG. 16 is a diagram showing an example of an offset map; and

FIG. 17 is a diagram showing examples of the gain map that considered the temperature of an ECU.

MODE FOR CARRYING OUT THE INVENTION

Figure 1:
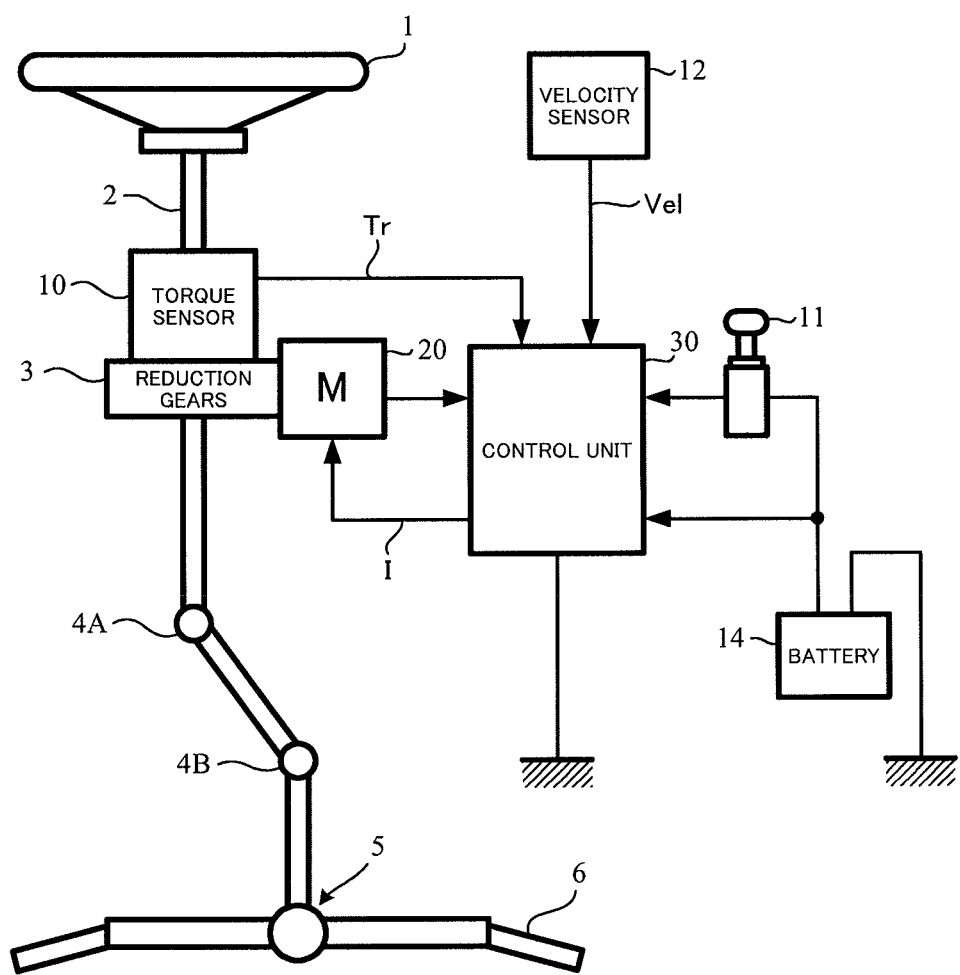
FIG. 1 is a configuration diagram illustrating a general outline of an electric power steering apparatus.

In the case of cranking at a time of engine shutdown, a variation in a power voltage (a battery voltage) is intense, there is a possibility that the power voltage drops to an assist shutdown voltage (an assist operation possible power voltage) in a conventional assist control. However, considering that a duration of the power voltage drop is short and there is a certain amount of a permissible time from the beginning of the power voltage drop to burnout of FETs, instead of limiting an assist amount only in accordance with the power voltage as usual, a first embodiment of the present invention uses a drive possible characteristic that determines an assist continuation permissible time in accordance with characteristics of the FETs after the power voltage drop occurred, and maintains an assist control within the assist continuation permissible time so as to avoid the assist shutdown within a range where the FETs do not burn out.

A second embodiment of the present invention calculates an assist possible current limitation value in accordance with a reduction duration from the assist operation possible power voltage and a level of the power voltage, and maintains the assist control with a limited condition as much as possible so as to avoid the assist shutdown within the range where the FETs do not burn out. That is, the present invention includes a current limiting map that defines a current limitation value corresponding to a reduction level of the power voltage based on a drive possible characteristic of the FETs comprising an FET-bridge within a motor driving circuit, calculates the assist possible current limitation value from a gain and an offset that correspond to a time course of dropping to less than the assist operation possible power voltage and the current limitation value of the current limiting map that corresponds to the power voltage when detecting that the power voltage dropped to less than the assist operation possible power voltage, and maintains the assist control with the limited condition as much as possible.

Further, in the first embodiment of the present invention, in the case that the power voltage dropped to less than or equal to a torque sensor minimum operating voltage of a torque sensor, by using a torque sensor detection value just before the power voltage dropped to less than or equal to the torque sensor minimum operating voltage or a past torque sensor detection value as an alternative value, it is possible to maintain the assist control with the power voltage that is lower than conventional measures against the power voltage drop. Therefore, even in a situation like cranking that the power voltage varied drastically in a short time, it is possible to realize the assist control without an uncomfortable feeling while suppressing behaviors of the steering assist.

That is, in the case that the power voltage dropped during the cranking, the first embodiment of the present invention determines an assist continuation permissible time corresponding to the dropped power voltage based on a relation between the power voltage and the assist continuation permissible time that is generated in accordance with characteristics of the FETs, obtains an assist correction gain by referring to a characteristic relation between the assist continuation permissible time and the assist correction gain, and maintains the assist control within the assist continuation permissible time while limiting the assist amount by means of the obtained assist correction gain. Further, in the case that the power voltage dropped to less than or equal to the torque sensor minimum operating voltage of the torque sensor, the first embodiment of the present invention sets the torque sensor detection value just before the power voltage dropped to less than or equal to the torque sensor minimum operating voltage or the past torque sensor detection value as the alternative value, and maintains the assist control. After the assist continuation permissible time passed, in the case that the power voltage recovered, the assist control according to the present invention is terminated and returns to normal control.

Moreover, in the case that the power voltage dropped to less than or equal to the torque sensor minimum operating voltage (smaller than the assist operation possible power voltage) of the torque sensor, the second embodiment of the present invention makes it possible to maintain the assist control with the power voltage that is lower than conventional measures against the power voltage drop by using the stored-torque sensor detection value just before the power voltage dropped to less than or equal to the torque sensor minimum operating voltage or the stored-past torque sensor detection value as the alternative value of the steering torque. Therefore, even in a situation like the cranking that the power voltage varied drastically in a short time, it is possible to realize the assist control without an uncomfortable feeling while certainly suppressing behaviors of the steering assist. In the case that the power voltage recovered during the engine operation after the cranking, the assist control with the limited condition according to the present invention is terminated and returns to the normal assist control.

Further, in the second embodiment, in particular, a temperature of an ECU is measured or estimated, an assist correction amount (the assist possible current limitation value) is calculated by using a parameter of a gain map or an offset map that corresponds to the temperature of the ECU, therefore control of a higher precision assist correction is possible.

Hereinafter, embodiments of the present invention will be described in detail with reference to the drawings.

At first, the first embodiment of the present invention will be described.

Figure 2:
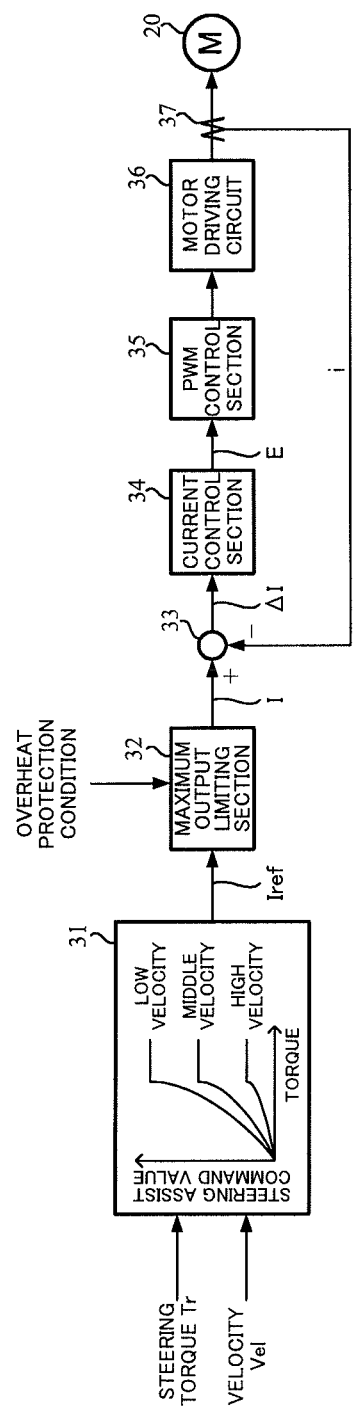
FIG. 2 is a block diagram showing a general configuration example of a control unit.
Figure 3:
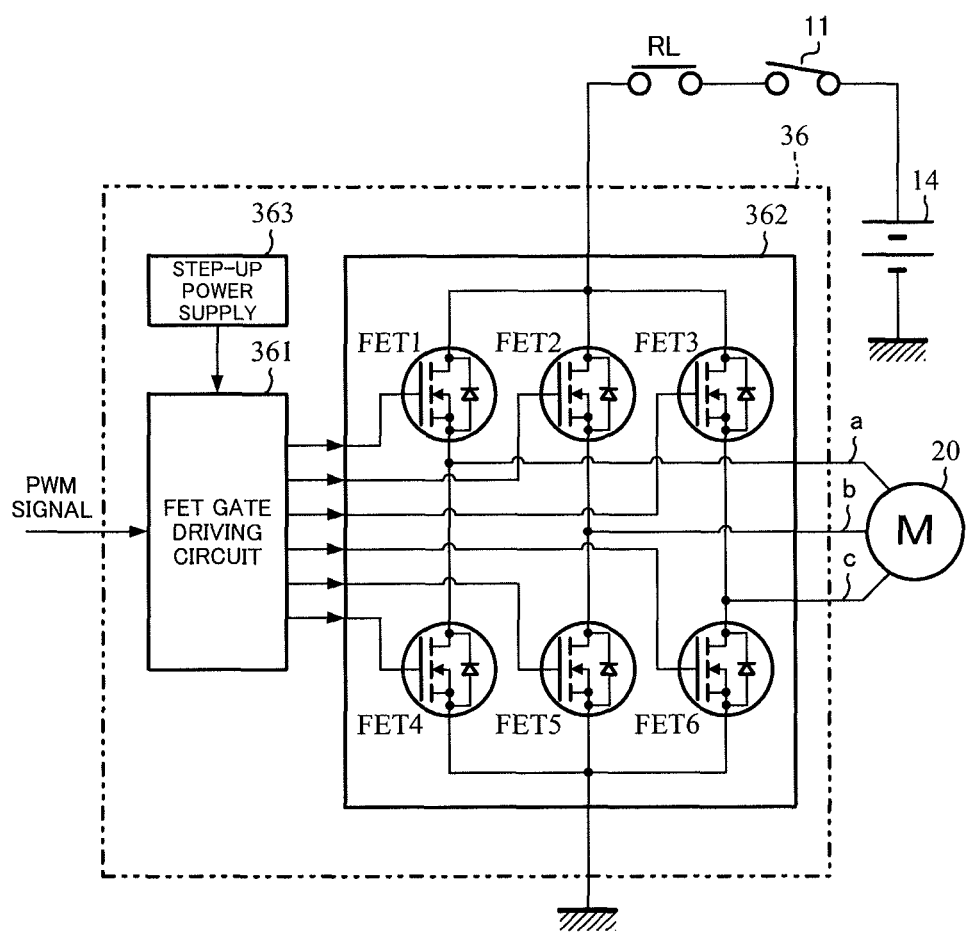
FIG. 3 is a wiring diagram showing a configuration example of a motor driving circuit.
Figure 4:
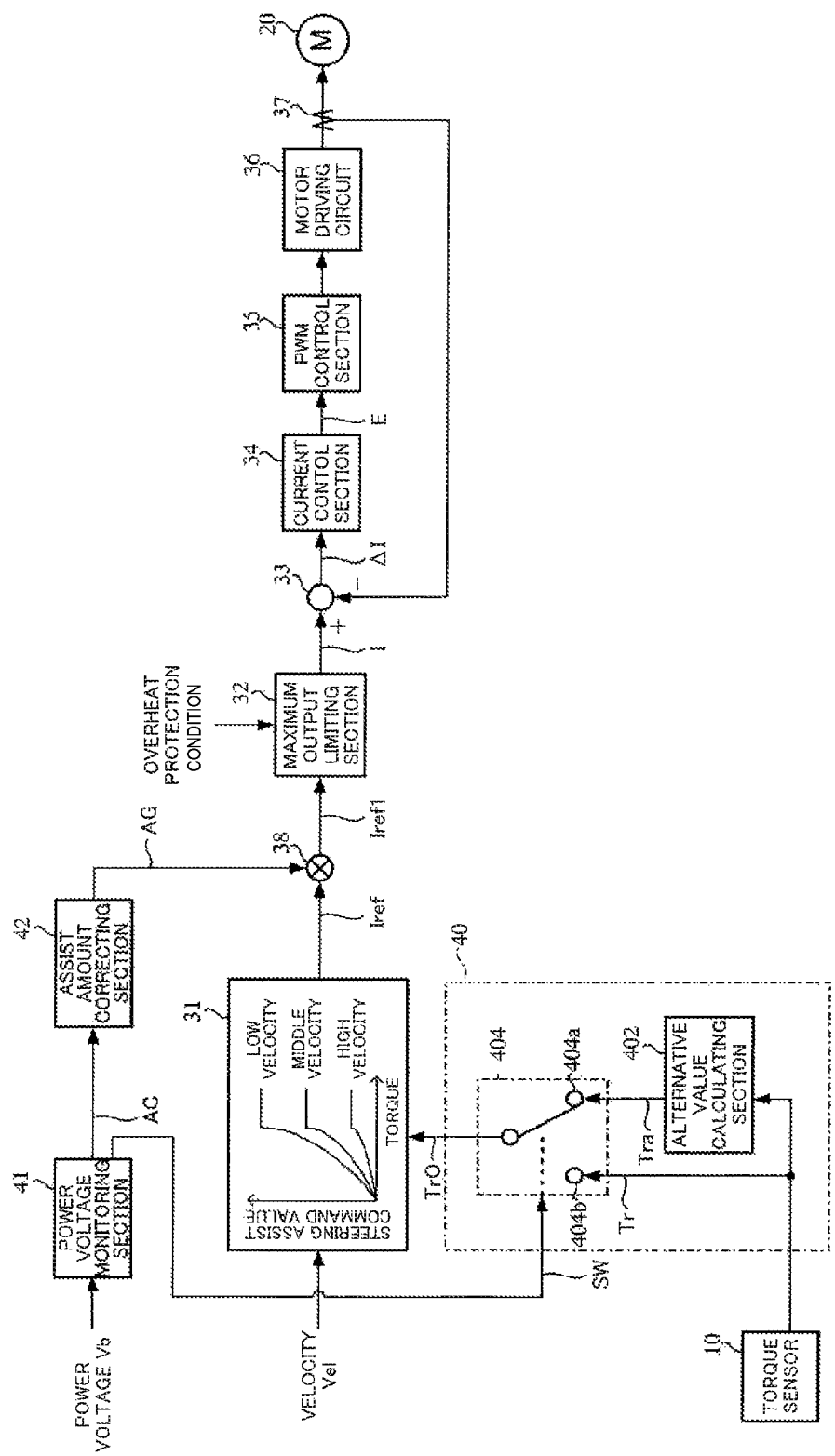
FIG. 4 is a block diagram showing a configuration example of a control unit according to a first embodiment of the present invention.

FIG. 4 is a block diagram showing a configuration example of a control unit 30 of an electric power steering apparatus according to the first embodiment of the present invention. Since FIG. 4 is a configuration diagram showing the configuration example of the control unit 30 as corresponding to the above-described FIG. 2, with respect to identical components, identical reference numerals are given without adding explanations. The control unit 30 according to the first embodiment newly comprises a torque input processing section 40, a power voltage monitoring section 41, an assist amount correcting section 42 and a multiplying section 38.

The power voltage monitoring section 41 inputs a power voltage Vb detected by a power voltage detecting means (not shown), compares to an assist operation possible power voltage that is preliminarily set as a threshold, and in the case that the detected power voltage Vb is less than or equal to the assist operation possible power voltage, determines that the detected power voltage Vb dropped. Then, the power voltage monitoring section 41 comprises a function that obtains an assist continuation permissible time AC based on a relation that is preliminarily set based on a drive possible characteristic of FETs of a motor driving section provided in the electric power steering apparatus, that is, the power voltage Vb at the time. The obtained assist continuation permissible time AC is inputted into the assist amount correcting section 42.

Further, the power voltage monitoring section 41 compares the power voltage Vb with the torque sensor minimum operating voltage, and when determined that the power voltage Vb is less than or equal to the torque sensor minimum operating power voltage, outputs a switching signal SW to the torque input processing section 40.

Figure 5:
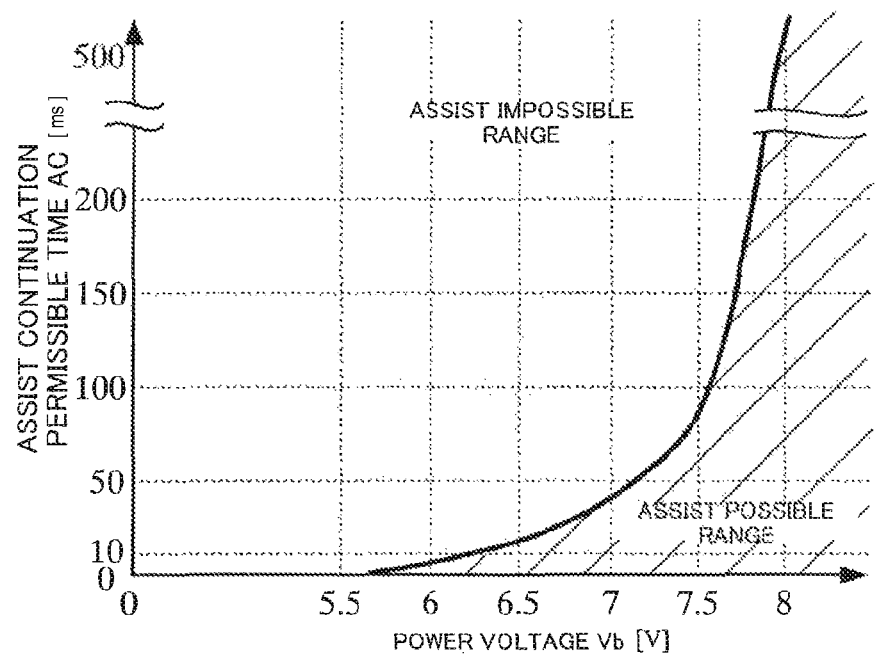
FIG. 5 is a characteristic diagram showing an example of a relation between a power voltage of a drive possible characteristic of the FETs and an assist continuation permissible time according to the present invention.

FIG. 5 is a characteristic diagram showing an example of a relation between the power voltage Vb that is the drive possible characteristic of the FETs and the assist continuation permissible time AC. Since as the power voltage Vb dropped, a drain-source on-state resistance RDS becomes large and heat occurred by power loss of the FETs becomes large, as shown in FIG. 5, as the power voltage Vb dropped, the assist continuation permissible time AC becomes short. Then, a shaded area in FIG. 5 is an assist possible range, and other blank area is an assist impossible range.

Figure 6:
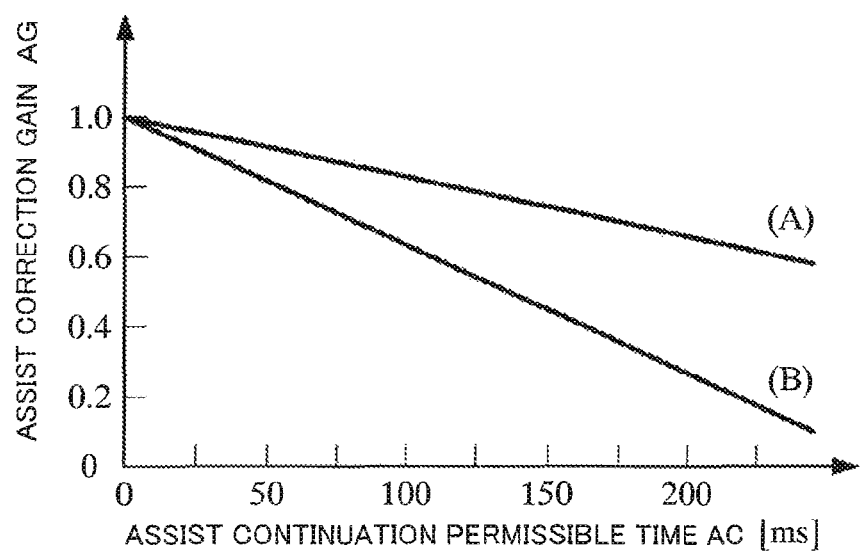
FIG. 6 is a characteristic diagram showing an example of a relation between the assist continuation permissible time and an assist correction gain according to the first embodiment of the present invention.

The assist amount correcting section 42 has a characteristic parameter (a lookup table) showing a correspondence relation between the inputted assist continuation permissible time AC and an assist correction gain AG, and a characteristic (A) in FIG. 6 shows a characteristic example of such a relation. The assist amount correcting section 42 uses the assist continuation permissible time AC inputted from the power voltage monitoring section 41, obtains the assist correction gain AG by referring to the relation characteristic diagram between the assist continuation permissible time AC and the assist correction gain AG, and inputs the obtained assist correction gain AG to the multiplying section 38. As shown in the characteristic (A) of FIG. 6, as the assist continuation permissible time AC becomes long, the assist correction gain AG becomes low and the maximum gain becomes "1.0".

The torque input processing section 40 comprises an alternative value calculating section 402 and a steering torque switching section 404, in the case that the power voltage Vb is more than or equal to the torque sensor minimum operating power voltage of the torque sensor 10, operates so as to directly input the steering torque Tr from the torque sensor 10 to the steering assist command value calculating section 31, and in the case that the power voltage Vb became less than or equal to the torque sensor minimum operating power voltage of the torque sensor 10, operates so as to switch contacts of the steering torque switching section 404 and input the detection value of the torque sensor 10 just before the power voltage Vb dropped or the past detection value of the torque sensor 10 to the steering assist command value calculating section 31 as an alternative value Tra.

The alternative value calculating section 402 stores a steering torque Tr detected by the torque sensor 10 just before (for example, before one sampling) such the sampling as the alternative value Tra. The steering torque switching section 404 has contacts 404a and 404b, the alternative value Tra from the alternative value calculating section 402 is inputted into the contact 404a, the steering torque Tr from the torque sensor 10 is inputted into the contact 404b, switched to the contact 404a or 404b in accordance with the switching signal SW from the power voltage monitoring section 41. That is, when the power voltage monitoring section 41 determined that the power voltage Vb is less than or equal to the torque sensor minimum operating voltage, switched to the contact 404a in accordance with the switching signal SW, the alternative value Tra is inputted into the steering assist command value calculating section 31 as a steering torque Tr0, and when the power voltage monitoring section 41 determined that the power voltage Vb is larger than the torque sensor minimum operating voltage, switched to the contact 404b in accordance with the switching signal SW, the steering torque Tr detected by the torque sensor 10 is inputted into the steering assist command value calculating section 31 as the steering torque Tr0. The steering assist command value calculating section 31 calculates a steering assist command value Iref based on the inputted steering torque Tr0 (Tra or Tr) and the velocity Vel.

In the multiplying section 38, the steering assist command value Iref calculated by the steering assist command value calculating section 31 is multiplied by the assist correction gain AG calculated by the assist amount correcting section 42, the result of the multiplication is inputted into the maximum output limiting section 32 as a steering assist command value Iref1. The maximum output limiting section 32 has a function that limits the maximum output so as to limit the maximum output based on an overheat protection condition and gradually decrease the current of the motor 20 (a descending process).

Figure 7:
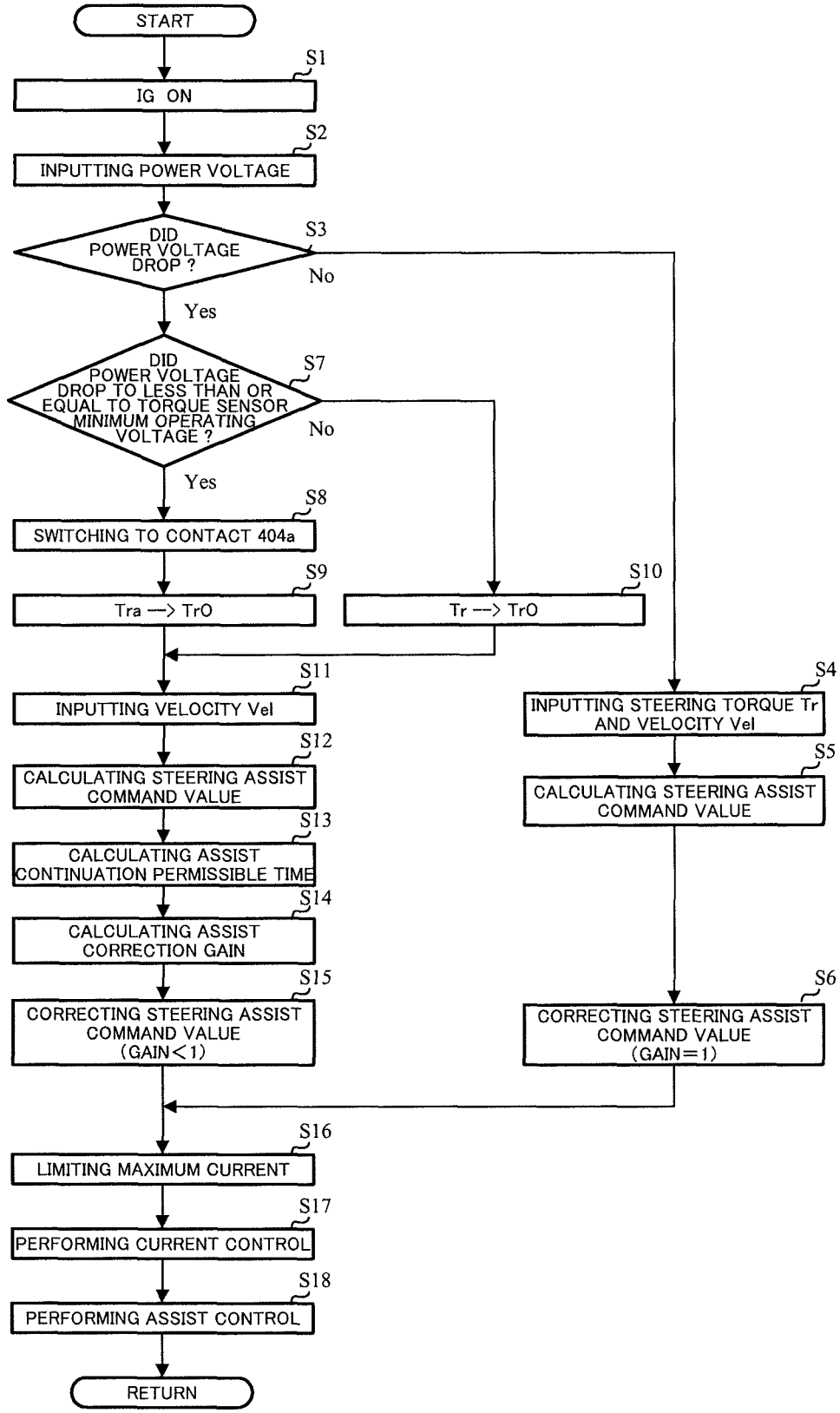
FIG. 7 is a flowchart showing a working example of an electric power steering apparatus according to the first embodiment of the present invention.

In such a configuration as described above, the operation example will be described with reference to a flowchart of FIG. 7.

At first, in a state that an ignition key 11 of a vehicle is turned-on (Step S1), a cranking in an idling-stop that a variation in the power voltage Vb is intense, starts. In this state, the steering torque switching section 404 is connected to the contact 404b. The power voltage monitoring section 41 detects the power voltage Vb (Step S2), determines whether the inputted power voltage Vb dropped to the assist operation possible power voltage or not (Step S3). When the power voltage monitoring section 41 determines that the power voltage Vb is larger than the assist operation possible power voltage, the steering assist command value calculating section 31 inputs the steering torque Tr detected by the torque sensor 10 and the velocity Vel detected by the velocity sensor 12 (Step S4), calculates the steering assist command value Iref based on the inputted steering torque Tr and velocity Vel, and inputs the steering assist command value Iref to the multiplying section 38 (Step S5). In this case, the power voltage monitoring section 41 corresponds to the assist continuation permissible time AC of the assist possible range shown in FIG. 5, and the assist correction gain AG from the assist amount correcting section 42 becomes "1.0". The calculated steering assist command value Iref is multiplied by the assist correction gain AG of "1.0" in the multiplying section 38 (Step S6), and inputted to the maximum output limiting section 32 (Step S16). Then, the same as described above, the current control is performed (Step S17) and the assist control according to the motor 20 is performed (Step S18).

On the other hand, in the above Step S3, when the power voltage monitoring section 41 determines that the power voltage Vb drops to less than or equal to the assist operation possible power voltage, the power voltage monitoring section 41 further determines whether the power voltage Vb dropped to less than or equal to the torque sensor minimum operating voltage or not (Step S7). When the power voltage monitoring section 41 determines that the power voltage Vb drops to less than or equal to the torque sensor minimum operating voltage, the steering torque switching section 404 is switched to the contact 404a by the switching signal SW (Step S8). In this way, the torque alternative value Tra stored in the alternative value calculating section 402 is inputted to the steering assist command value calculating section 31 as the steering torque Tr0 (Step S9). When determining that the power voltage Vb is larger than the torque sensor minimum operating voltage, the switching signal SW is not outputted, and the steering torque Tr detected by the torque sensor 10 is directly inputted to the steering assist command value calculating section 31 as the steering torque Tr0 (Step S10).

The velocity Vel is inputted to the steering assist command value calculating section 31 (Step S11), based on the inputted the steering torque Tr0 (Tr or Tra) and the velocity Vel, the steering assist command value Iref is calculated and inputted to the multiplying section 38 (Step S12). The power voltage monitoring section 41 calculates the assist continuation permissible time AC based on the relation between the power voltage Vb and the assist continuation permissible time AC (Step S13), the calculated assist continuation permissible time AC is inputted to the assist amount correcting section 42 and the assist correction gain AG is calculated (Step S14). The assist correction gain AG of this time becomes smaller than "1.0" from the characteristic (A) in FIG. 6. The assist correction gain AG calculated in the assist amount correcting section 42 is inputted to the multiplying section 38, by multiplying the steering assist command value Iref by the assist correction gain AG in the multiplying section 38, the steering assist command value Iref is corrected (Step S15). The corrected steering assist command value Iref is inputted to the maximum output limiting section 32 and is limited by a factor such as an overheat protection condition (Step S16), based on the current command value I limited in the current control section 34, the current control is performed (Step S17), and with respect to the motor 20, the assist control is performed (Step S18).

Figure 8:
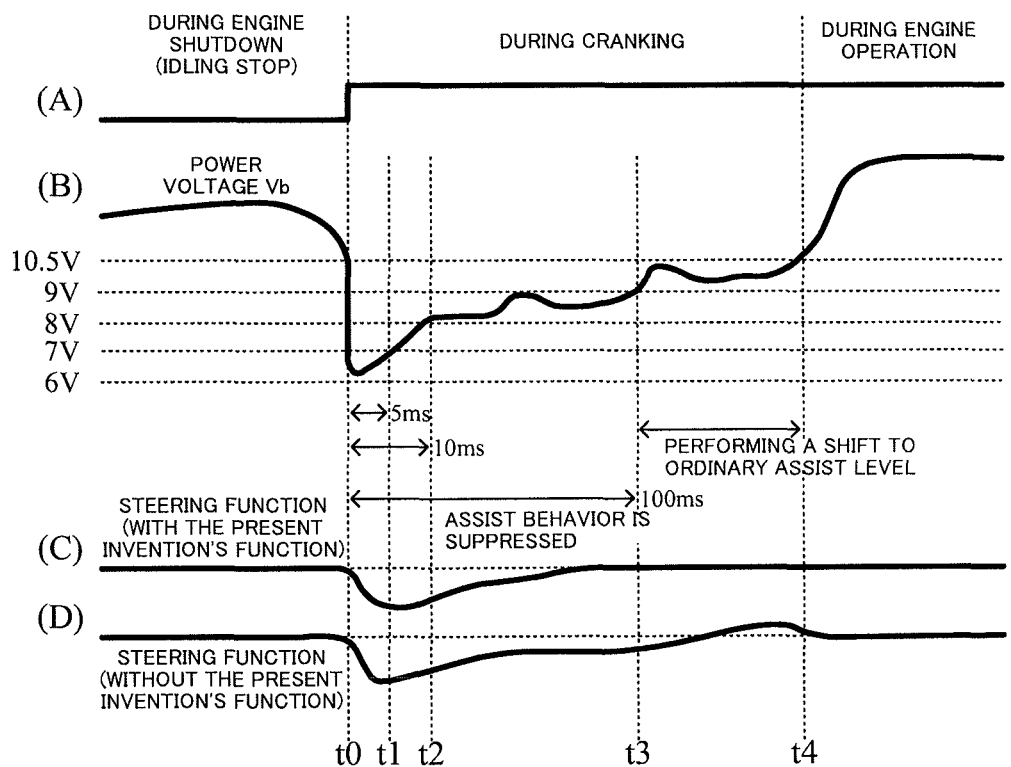
FIG. 8 is a time chart showing simulation results at the time of cranking of the electric power steering apparatus according to the first embodiment of the present invention.

FIG. 8 is a time chart showing simulation results of the first embodiment. FIG. 8(B) is a curve showing a variation in the power voltage Vb of the electric power steering apparatus. FIG. 8(C) is a curve showing steering behaviors of the electric power steering apparatus according to the first embodiment, and FIG. 8(D) is a curve showing steering behaviors of an electric power steering apparatus without the present invention's function. At a time point to, the ignition key is turned-on, and the cranking starts, the power voltage Vb suddenly descended and dropped to approximate 6[V]. From the characteristic between the power voltage Vb and the assist continuation permissible time AC in FIG. 5, in the case that the power voltage Vb is 6[V], the assist continuation permissible time AC is about 5[ms], the assist control is maintained while limiting the assist amount with the assist correction gain AG calculated based on the relation between the assist continuation permissible time AC and the assist correction gain AG. When becoming a time point t3, the power voltage Vb recovers to a normal level and the assist amount also returns to an ordinary level. When becoming a time point t4, entering an engine operation state, and the cranking finishes. During a drop period of the power voltage Vb (from the time point t0 to the time point t3), although the power voltage Vb dropped to less than or equal to a power voltage that the assist is shut down in conventional electric power steering apparatuses, instead of shutting down the assist, the present invention maintains the assist within the assist continuation permissible time AC so that it is possible to suppress behaviors of the steering assist. On the other hand, by watching the behaviors of the electric power steering apparatus without the present invention's function, it is clear that when the cranking starts, the power voltage Vb varies drastically and kickback occurs.

Moreover, in the above-described embodiment, when calculating the assist correction gain AG, although the characteristic between the assist continuation permissible time AC and the assist correction gain AG that is based on the characteristic of the FETs is used, by using a characteristic generated in consideration of an internal temperature (increase in temperature) of an ECU (Engine Control Unit) such as a characteristic (B) in FIG. 6, it is also possible to limit the assist amount to become smaller when the ECU-temperature rises. In this way, the current flowing in the motor 20 is limited smaller, the steering operation during the idling-stop also becomes possible even in a high-temperature environment.

Further, in the above-described embodiment, when correcting the assist amount, although the characteristic in the form of a gain is used, it is also possible to use correction methods in other forms such as characteristic parameters in a map form, an offset form or the like.

Moreover, although the alternative value calculating section 402 calculates a steering torque value before one sampling, it is possible to calculate a past value before several samplings and to change arbitrarily and appropriately.

Next, the second embodiment of the present invention will be described.

Figure 9:
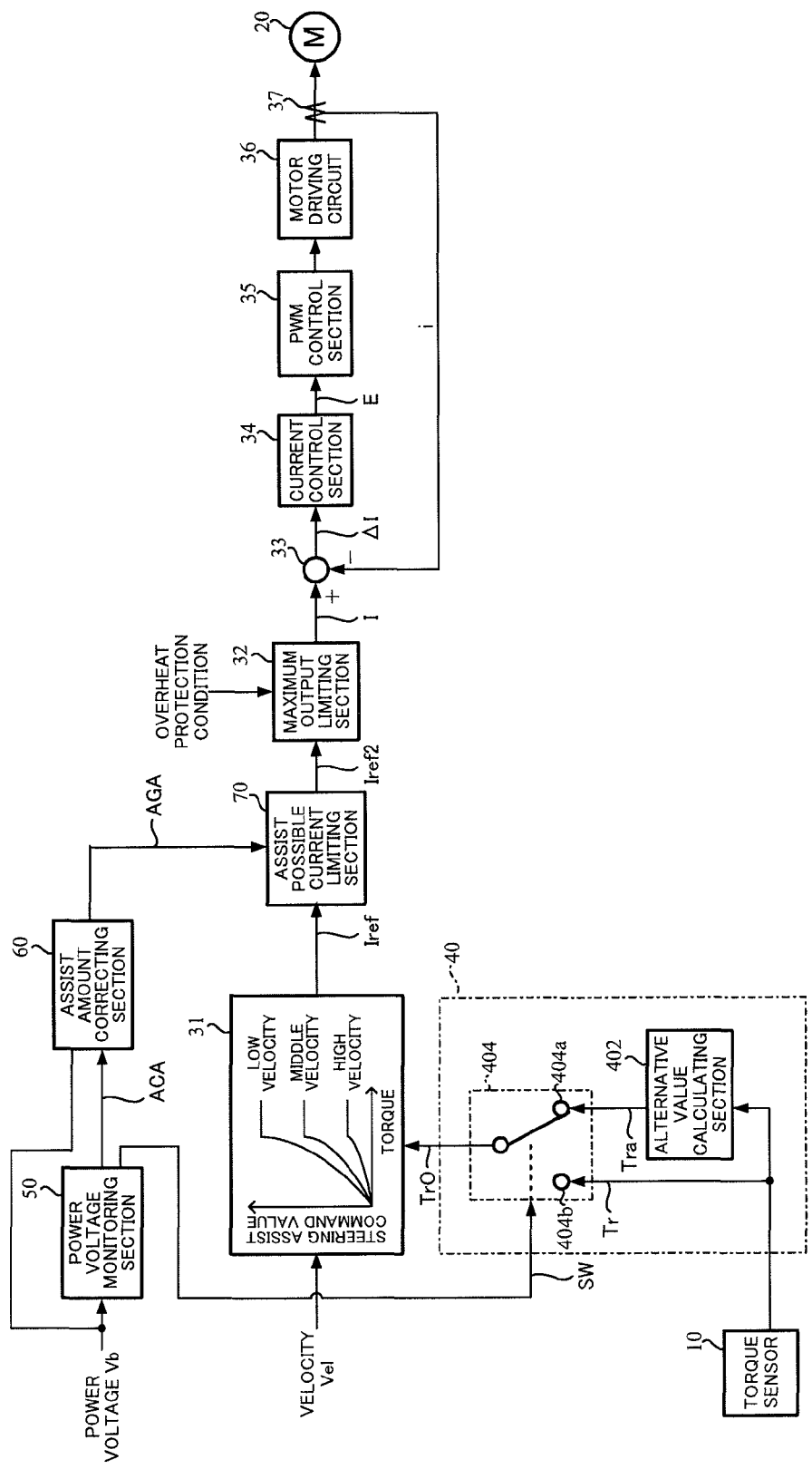
FIG. 9 is a block diagram showing a configuration example of a control unit according to a second embodiment of the present invention.

FIG. 9 is a block diagram showing a configuration example of a control unit 30 of an electric power steering apparatus according to the present invention. Since FIG. 9 is a configuration diagram showing the configuration example of the control unit 30 as corresponding to the above-described FIG. 4, with respect to identical components, identical reference numerals are given without adding explanations. The control unit 30 according to the second embodiment newly comprises a power voltage monitoring section 50, an assist amount correcting section 60 and an assist possible current limiting section 70. A power voltage Vb detected by a power voltage detecting means (not shown) is inputted to the power voltage monitoring section 50 and the assist amount correcting section 60.

The power voltage monitoring section 50 inputs the power voltage Vb, compares with an assist operation possible power voltage (for example, 8[V]) that is in advance set as a threshold, and in the case that the power voltage Vb is lower than the assist operation possible power voltage, determines that the power voltage Vb is lower than the assist operation possible power voltage and outputs a level lowering signal ACA to the assist amount correcting section 60. Further, in the case that the power voltage Vb became less than or equal to the torque sensor minimum operating voltage, the power voltage monitoring section 50 outputs a switching signal SW to the torque input processing section 40.

As described above, since as the power voltage Vb dropped, a drain-source on-state resistance RDS becomes large and heat occurred by power loss of the FETs becomes large, as described in FIG. 5, as the power voltage Vb dropped, a duration of voltage drop state becomes short. When the level lowering signal ACA is inputted from the power voltage monitoring section 50, the assist amount correcting section 60 calculates an assist possible current limitation value AGA from a relation with the duration of voltage drop state, inputs the assist possible current limitation value AGA to the assist possible current limiting section 70 and limits the steering assist command value Iref. As shown in FIG. 12, as the duration of voltage drop state becomes long, the assist possible current limitation value AGA becomes low.

Here, in the second embodiment, in order to obtain an assist possible current limitation value AGA, the assist amount correcting section 60 employs a configuration as shown in FIG. 10. That is, the assist amount correcting section 60 comprises a current limiting map 61 that is based on a basic characteristic of the current limitation value of the FETs with respect to the level of the power voltage Vb based on the drive characteristic of the FTEs comprising an FET-bridge as shown in FIG. 11, a timer 63 that measures an elapsed time Tt from a time point that the power voltage Vb dropped to less than the assist operation possible power voltage, a gain map 62 that a gain Gm corresponding to a duration (the elapsed time) Tt from a time point that the power voltage Vb dropped to less than the assist operation possible power voltage (i.e. a duration of normal time assist impossible range voltage) and the power voltage Vb is set up, and a multiplying section 64 that multiplies the current limitation value from the current limiting map 61 by the gain Gm from the gain map 62.

FIG. 11 is a current limiting map 61 showing an example of the current limitation value with respect to an FET with a rated current 120[A] specification, for example, when the power voltage Vb is 7.0[V], the current limitation value is 80[A], and when the power voltage Vb is 8.0[V], the current limitation value is 120 [A], however, showing a matter that both of which can not pass the current for a long time in that state, that is, a matter that there is a duration of a voltage drop state. The current limitation value of the FET is defined in accordance with a level that the power voltage Vb dropped to less than the assist operation possible power voltage, based on such a drive possible characteristic of the FTEs, the current limiting map 61 as shown in FIG. 11 is generated and set up.

Further, the gain map 62 is a content as shown in FIG. 12, the gain Gm corresponding to the duration Tt from a time point that the power voltage Vb dropped to less than the assist operation possible power voltage (i.e. the duration of normal time assist impossible range voltage) and the power voltage Vb is set up. In this embodiment, the duration Tt of voltage drop is divided into nine ranges, i.e. more than or equal to 0[ms]~less than 5[ms], more than or equal to 5[ms]-less than 10[ms], more than or equal to 10[ms]-less than 20[ms], more than or equal to 20[ms]-less than 50[ms], more than or equal to 50[ms]-less than 100[ms], more than or equal to 100[ms]-less than 150[ms], more than or equal to 150[ms]-less than 200[ms], more than or equal to 200[ms]-less than 300[ms] and more than or equal to 300[ms], the gain Gm is set up after dividing a range that the power voltage Vb dropped to less than the assist operation possible power voltage (this embodiment is 8[V]) into three steps (8[V], 7[V] and 6[V]). It is possible to appropriately change such setup of the range of the duration Tt and the power voltage Vb, and it is possible to obtain a characteristic between voltages by averaging characteristic values of two voltages.

The timer 63 measures the duration Tt from a time point that the level lowering signal ACA is inputted from the power voltage monitoring section 50 and inputs the duration Tt to the gain map 62. The gain map 62 calculates the gain Gm based on the inputted duration Tt and the power voltage Vb and outputs the gain Gm.

The current limitation value from the current limiting map 61 is multiplied by the gain Gm from the gain map 62 in the multiplying section 64, and a multiplication result is outputted as the assist possible current limitation value AGA. The assist possible current limitation value AGA is inputted to the assist possible current limiting section 70, and the steering assist command value Iref1 that limited the steering assist command value Iref is inputted to the maximum output limiting section 32.

On the other hand, the configuration and operation of the torque input processing section 40 are totally same as the configuration and operation that are described in the first embodiment.

In the assist possible current limiting section 70, the steering assist command value Iref calculated by the steering assist command value calculating section 31 is compared with the assist possible current limitation value AGA calculated by the assist amount correcting section 60. That is, the assist possible current limiting section 70 compares the assist possible current limitation value AGA with the steering assist command value Iref, and inputs a small value to the maximum output limiting section 32 as the steering assist command value Iref2. The maximum output limiting section 32 has a function that limits the maximum output so as to limit the maximum output in accordance with an overheat protection condition and gradually decrease the current of the motor 20 (a descending process).

Figure 13:
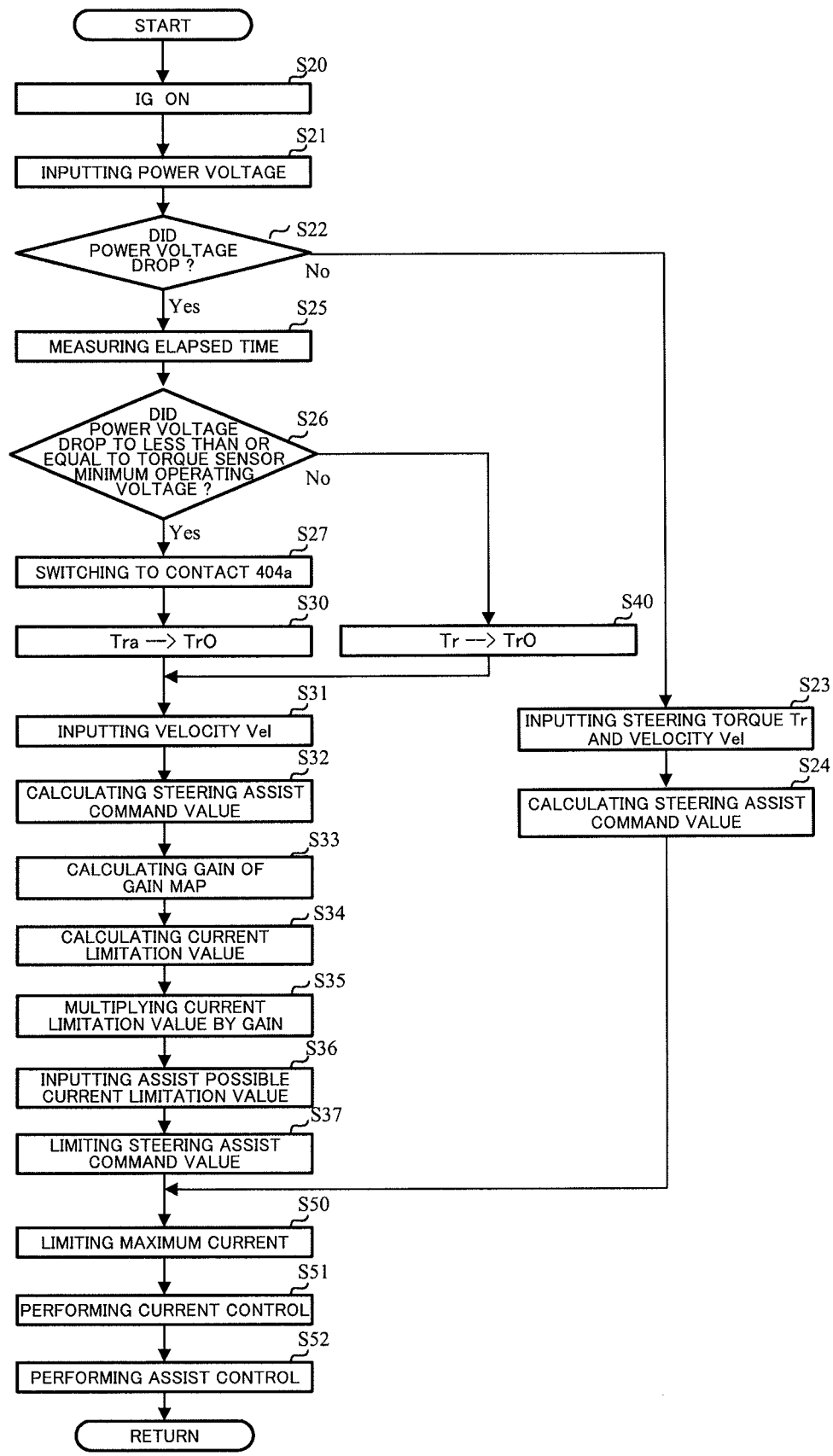
FIG. 13 is a flowchart showing a working example of an electric power steering apparatus according to the second embodiment of the present invention.

In such a configuration as described above, the operation example will be described with reference to a flowchart of FIG. 13.

At first, in a state that an ignition key 11 of a vehicle is turned-on (Step S20), a cranking in idling-stop that a variation in the power voltage Vb is intense, starts. In this state, the steering torque switching section 404 is connected to the contact 404b. The power voltage Vb detected by the power voltage detecting means is inputted to the power voltage monitoring section 50, and the current limiting map 61 and the gain map 62 within the assist amount correcting section 60 (Step S21), the power voltage monitoring section 50 determines whether the inputted power voltage Vb dropped to less than the assist operation possible power voltage (for example, 8[V]) or not (Step S22). When the power voltage monitoring section 50 determines that the power voltage Vb is more than or equal to the assist operation possible power voltage, the steering assist command value calculating section 31 inputs the steering torque Tr detected by the torque sensor 10 through the steering torque switching section 404 and simultaneously inputs the velocity Vel detected by the velocity sensor 12 (Step S23). The steering assist command value calculating section 31 calculates the steering assist command value Iref based on the inputted steering torque Tr and the velocity Vel, and the steering assist command value Iref is inputted to the assist possible current limiting section 70 (Step S24). The steering assist command value Iref2 from the assist possible current limiting section 70 is inputted to the maximum output limiting section 32 and the current control is performed (Step S50), and then, the same as described above, the current control is performed (Step S51) and the assist control according to the motor 20 is performed (Step S52).

On the other hand, in the above Step S22, when determining that the power voltage Vb dropped to less than the assist operation possible power voltage, the power voltage monitoring section 50 outputs the level lowering signal ACA, and the timer 63 within the assist amount correcting section 60 starts the measurement of the duration Tt (Step S25). The power voltage monitoring section 50 further determines whether the power voltage Vb dropped to less than or equal to the torque sensor minimum operating voltage or not (Step S26). When the power voltage monitoring section 50 determines that the power voltage Vb dropped to less than or equal to the torque sensor minimum operating voltage, the power voltage monitoring section 50 outputs a switching signal SW. Then, by means of the switching signal SW, the contact of the steering torque switching section 404 is switched from the contact 404b to the contact 404a (Step S27), the torque alternative value Tra stored in the alternative value calculating section 402 is inputted to the steering assist command value calculating section 31 as the steering torque Tr0 (Step S30). Further, when the power voltage monitoring section 50 determines that the power voltage Vb is larger than the torque sensor minimum operating voltage, the switching signal SW is not outputted, and the steering torque Tr detected by the torque sensor 10 is directly inputted to the steering assist command value calculating section 31 as the steering torque Tr0 through the steering torque switching section 404 (Step S40).

Thereafter, the velocity Vel is inputted to the steering assist command value calculating section 31 (Step S31), based on the inputted the steering torque Tr0 (Tr or Tra) and the velocity Vel, the steering assist command value Iref is calculated and then inputted to the assist possible current limiting section 70 (Step S32). The timer 63 within the assist amount correcting section 60 measures the duration Tt from a time point that the power voltage Vb became lower than the assist operation possible power voltage (Step S25), the gain map 62 calculates the gain Gm based on the inputted power voltage Vb and the duration Tt (Step S33), the current limiting map 61 calculates the current limitation value based on the inputted power voltage Vb (Step S34). The current limitation value calculated in the current limiting map 61 is multiplied by the gain Gm calculated in the gain map 62 in the multiplying section 64 (Step S35), the assist amount correcting section 60 calculates the assist possible current limitation value AGA and inputs to the assist possible current limiting section 70 (Step S36). The assist possible current limitation value AGA calculated in the assist amount correcting section 60 is inputted to the assist possible current limiting section 70, by comparing the assist possible current limitation value AGA with the steering assist command value Iref in the assist possible current limiting section 70, the steering assist command value Iref is limited (Step S37). The steering assist command value Iref2 that the current is limited in the assist possible current limiting section 70, is inputted to the maximum output limiting section 32 and the maximum output is limited by a factor such as an overheat protection condition (Step S50), based on the current command value I limited in the current control section 34, the current control is performed (Step S51), and with respect to the motor 20, the assist control is performed (Step S52).

Figure 14:
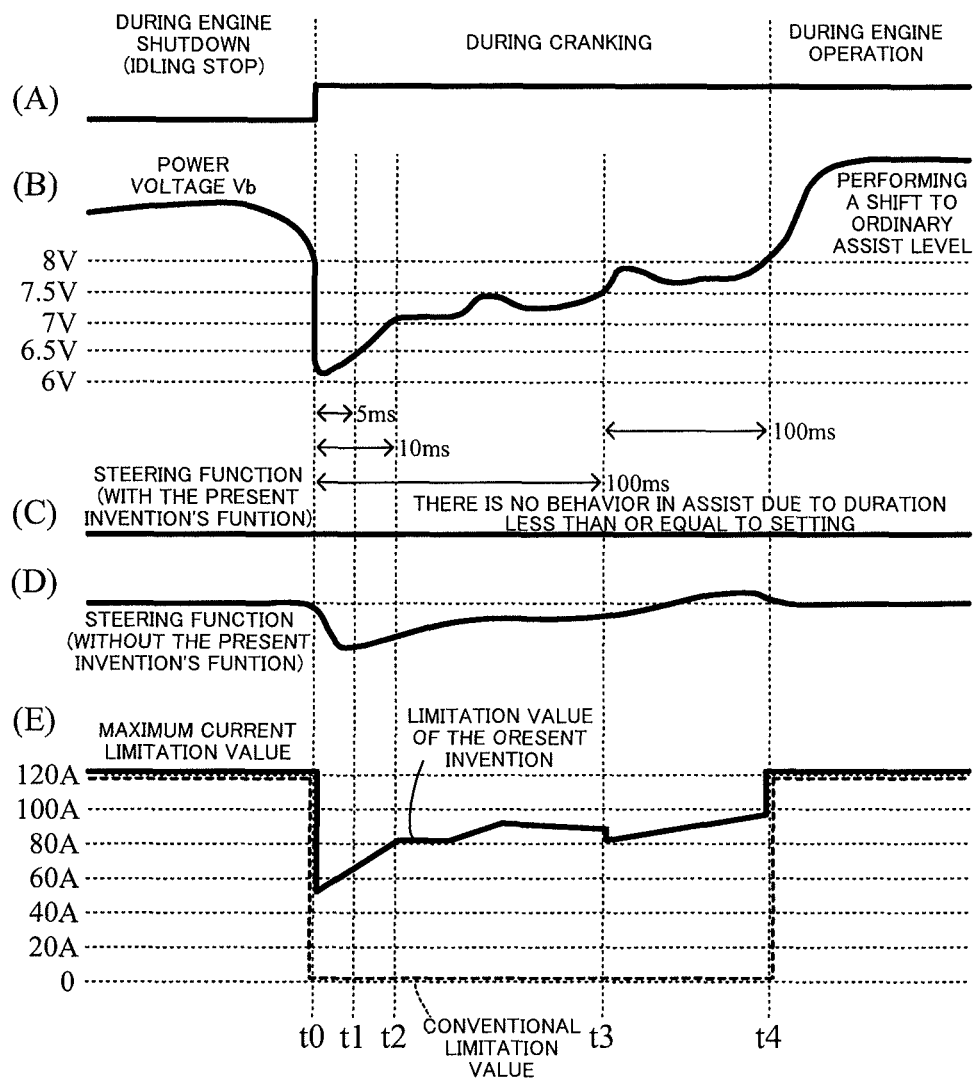
FIG. 14 is a time chart showing simulation results at the time of cranking of the electric power steering apparatus according to the second embodiment of the present invention.

FIG. 14 is a time chart showing simulation results of the second embodiment. FIG. 14(B) is a characteristic example showing a variation in the power voltage Vb of the electric power steering apparatus. FIG. 14(C) is a characteristic example showing steering behaviors of the electric power steering apparatus according to the second embodiment, and FIG. 14(D) is a characteristic example showing steering behaviors of an electric power steering apparatus without the present invention's function. As shown in FIG. 14(A), at time point to, the ignition key is turned-on, and a cranking starts, the power voltage Vb suddenly descended to less than or equal to the assist operation possible power voltage and dropped to about 6[V]. After the time point to that the power voltage Vb becomes less than or equal to the assist operation possible power voltage, the timer 63 measures the duration Tt, based on the relation between the duration Tt and the power voltage Vb, the gain Gm is calculated in the gain map 62. Then, the current limitation value corresponding to the power voltage Vb is calculated in the current limiting map 61, the assist possible current limitation value AGA is obtained by the multiplication of the gain Gm and the current limitation value, the assist control is maintained while limiting the assist amount (the steering current command value Iref) with the assist possible current limitation value AGA. Such an assist control is maintained while the power voltage Vb becomes less than or equal to the assist operation possible power voltage.

When becoming a time point t4, entering an engine operation state, and the cranking finishes. Therefore, the power voltage Vb recovers to a normal level and the assist amount also returns to an ordinary level. In this embodiment, during a drop period of the power voltage Vb (from the time point t0 to the time point t4), the power voltage Vb dropped to less than or equal to the assist operation possible power voltage that the assist is shut down in conventional electric power steering apparatuses. However, the present invention obtains, instead of shutting down the assist, the assist possible current limitation value AGA by means of the gain Gm calculated from the gain map 62 and the current limitation value calculated from the current limiting map 61, and maintains the assist control while limiting the assist amount with the assist possible current limitation value AGA so that it is possible to certainly suppress behaviors of the steering assist as shown in FIG. 14(C).

On the other hand, by watching the behaviors of the electric power steering apparatus without the present invention's function, it is clear that when the cranking starts, the power voltage Vb varies drastically, kickback occurs as shown in FIG. 14(D) and effects of the present invention are remarkable in behaviors.

In the above-described embodiment, although the calculation of the assist possible current limitation value AG is performed by using the gain map 62 and the current limiting map 61 and by the multiplication of the gain Gm, instead of the gain map 62, it is also possible to perform by using an offset map and by a subtraction of an offset Os.

FIG. 15 shows a configuration example in that case, an offset map 66 that inputs the duration Tt from the timer 63 and the power voltage Vb and a subtracting section 67 that performs a subtraction processing are comprised. For example, the offset map 66 is a configuration shown in FIG. 16, an offset Os corresponding to the duration Tt from a time point that the power voltage Vb dropped to less than the assist operation possible power voltage (i.e. the duration of the normal time assist impossible range voltage) and the power voltage Vb is set up. In this embodiment, the duration is divided into nine ranges, i.e. more than or equal to 0[ms]-less than 5[ms], more than or equal to 5[ms]-less than 10[ms], more than or equal to 10[ms]-less than 20[ms], more than or equal to 20[ms]-less than 50[ms], more than or equal to 50[ms]-less than 100[ms], more than or equal to 100[ms]-less than 150[ms], more than or equal to 150[ms]-less than 200 [ms], more than or equal to 200[ms]-less than 300[ms] and more than or equal to 300[ms], the offset Os is set up after dividing a range that the power voltage Vb dropped to less than the assist operation possible power voltage (this embodiment is 8[V]) into three steps (8[V], 7[V] and 6[V]). It is possible to appropriately change such setup of the range of the duration and the power voltage Vb that sets up the offset Os.

Then, the offset map 66 calculates the offset Os based on the duration Tt from the timer 63 and the power voltage Vb and inputs to the subtracting section 67, the current limiting map 61 calculates the current limitation value based on the power voltage Vb and inputs to the subtracting section 67, the subtraction result (the current limitation value-the offset Os) in the subtracting section 67 is outputted as the assist possible current limitation value AGA.

Moreover, in the above-described embodiment, although the alternative value calculating section 402 calculates a steering torque value before one sampling, it is possible to calculate a past value before several samplings and to change arbitrarily and appropriately.

Further, it is also preferable to measure or estimate an internal temperature of an ECU and comprise a current limiting map or a gain map in accordance with the internal temperature of the ECU. For example, it is possible to estimate the internal temperature of the ECU as described in Japanese Patent No. 4221907. FIG. 17 shows that example corresponding to the gain map of FIG. 12. FIG. 17(A) is a parameter of a gain map to use when the internal temperature of the ECU increases (for example, 40° C.), and FIG. 17(B) is a parameter of a gain map to use when the internal temperature of the ECU further increases (for example, 80° C.). In this way, it is also possible to prepare multiple gain maps, switch the gain maps in accordance with the internal temperature of the ECU and use them. With respect to the offset shown in FIG. 16, similarly, it is also possible to prepare parameter maps corresponding to the internal temperature of the ECU, switch the parameter maps in accordance with the internal temperature of the ECU and use them.

EXPLANATION OF REFERENCE NUMERALS 10 torque sensor
12 velocity sensor
13 power relay
20 motor
31 steering assist command value calculating section
32 maximum output limiting section
33 subtracting section
34 current control section
35 PWM-control section
36 motor driving circuit
37 motor current detecting circuit
38 multiplying section
40 torque input processing section
402 alternative value calculating section 404 steering torque switching section
41,50 power voltage monitoring section
42,60 assist amount correcting section
70 assist possible current limiting section

The invention claimed is:

1. An electric power steering apparatus comprising a torque sensor to detect a steering torque applied to a steering mechanism, a steering assist command value calculating section to calculate a steering assist command value, a motor for generating an assist force that assists steering of a steering wheel, and a motor drive control section to calculate an assist amount based on said steering assist command value and to control drive of said motor through a driving section comprising a bridge of Field Effect Transistors (FETs), wherein said electric power steering apparatus further comprising:
 a power voltage monitoring section to determine by comparing a power voltage detection value with a threshold;
 an assist amount correcting section to calculate an assist correction gain based on an assist continuation permissible time from said power voltage monitoring section;
 a multiplying section to multiply said steering assist command value by said assist correction gain; and
 a torque input processing section to input said steering torque and a switching signal from said power voltage monitoring section and to output said steering torque or an alternative value to said steering assist command value calculating section;
 wherein as said power voltage detection value becomes low, said assist continuation permissible time becomes short based on a drive possible characteristic of said FET;
 wherein an assist control is continued by multiplying said steering assist command value with said assist correction gain corresponding to characteristics of a voltage and a time; and
 wherein, when said power voltage monitoring section determines that said power voltage detection value drops and said dropped power voltage detection value becomes less than or equal to an assist operation possible power voltage, said power voltage monitoring section outputs said assist continuation permissible time based on said dropped power voltage detection value, and when said power voltage monitoring section determines that said power voltage detection value further drops and said further dropped power voltage detection value becomes less than or equal to a torque sensor minimum operation voltage, said power voltage monitoring section outputs said switching signal so that an input to said steering assist command value calculating section is switched from said steering torque to said alternative value.

2. An electric power steering apparatus according to claim 1 wherein a maximum value of said assist correction gain is "1.0", and as said assist continuation permissible time becomes short, said assist correction gain also becomes low.

3. An electric power steering apparatus according to claim 2, wherein said assist correction gain is corrected in accordance with an internal temperature of an Electronic Control Unit (ECU).

4. An electric power steering apparatus according to claim 1, wherein said torque input processing section comprises an alternative value calculating section to store a past value of said steering torque as said alternative value and a steering torque switching section to input said steering torque or said alternative value to said steering assist command value calculating section based on said switching signal.

5. An electric power steering apparatus comprising a torque sensor to detect a steering torque applied to a steering mechanism, a steering assist command value calculating section to calculate a steering assist command value, a motor for generating an assist force that assists steering of a steering wheel, and a motor drive control section to calculate an assist amount based on said steering assist command value and to control drive of said motor through a driving section comprising a bridge of Field Effect Transistors (FETs),
 wherein said electric power steering apparatus further comprising:
 a power voltage monitoring section to determine by comparing a power voltage detection value with a threshold;
 an assist amount correcting section to calculate an assist possible current limitation value based on a level lowering signal from said power voltage monitoring section and said power voltage detection value;
 an assist possible current limiting section to limit said steering assist command value based on said assist possible current limitation value; and
 a torque input processing section to input said steering torque and a switching signal from said power voltage monitoring section and to output said steering torque or an alternative value to said steering assist command value calculating section;
 wherein said assist possible current limiting section outputs a small one of said steering assist command value and said assist possible current limitation value;
 wherein, when said power voltage monitoring section determines that said power voltage detection value drops and said dropped power voltage detection value becomes less than or equal to an assist operation possible power voltage, said power voltage monitoring section outputs a level lowering signal, and when said power voltage monitoring section determines that said power voltage detection value further drops and said further dropped power voltage detection value becomes less than or equal to a torque sensor minimum operating voltage, said power voltage monitoring section outputs said switching signal so that an input to said steering assist command value calculating section is switched from said torque to said alternative value.

6. An electric power steering apparatus according to claim 5, wherein said assist amount correcting section comprises a timer to measure an elapsed time of said level lowering signal, an offset map to input said elapsed time and said power voltage detection value, a current limiting map to input said power voltage detection value, and a subtracting section to subtract an offset of said offset map from a current limitation value of said current limiting map, and
 thereby to output said assist possible current limitation value from said subtracting section.

7. An electric power steering apparatus according to claim 5, wherein said torque input processing section comprises an alternative value calculating section to store a past value of said steering torque as said alternative value and a steering torque switching section to input said steering torque or said alternative value to said steering assist command value calculating section based on said switching signal.

8. An electric power steering apparatus according to claim 5, wherein said assist amount correcting section comprises a timer to measure an elapsed time of said level lowering signal, a gain map to input said elapsed time and said power voltage detection value, a current limiting map to input said power voltage detection value, and a multiplying section to multiply a current limitation value from said current limiting map by a gain from said gain map, and thereby to output said assist possible current limitation value from said multiplying section.

9. An electric power steering apparatus according to claim 8, wherein as said power voltage detection value is great, an output characteristic of said current limiting map is great.

* * * * *